United States Patent
Sbongk

(10) Patent No.: US 6,729,822 B2
(45) Date of Patent: May 4, 2004

(54) FASTENING HAVING INNER DEFORMABLE HOLLOW ELEMENT AND OUTER SLEEVE

(75) Inventor: Albert Sbongk, Niederstetten (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 0 days.

(21) Appl. No.: 10/188,807

(22) Filed: Jul. 5, 2002

(65) Prior Publication Data

US 2003/0007846 A1 Jan. 9, 2003

(30) Foreign Application Priority Data

Jul. 7, 2001  (DE) .......................................... 101 33 063

(51) Int. Cl.⁷ ............................ F16B 37/08; F16B 39/36
(52) U.S. Cl. ........................ 411/433; 411/267; 411/270; 411/437
(58) Field of Search ................................ 411/267, 270, 411/338, 339, 433, 437, 512

(56) References Cited

U.S. PATENT DOCUMENTS

| | | | |
|---|---|---|---|
| 2,308,914 A | | 1/1943 | Gerhold |
| 4,830,560 A | | 5/1989 | Hirohata |
| 4,890,964 A | * | 1/1990 | Lindley et al. ............. 411/270 |
| 5,711,645 A | * | 1/1998 | Sanbonmatsu et al. . 411/267 X |
| 5,947,669 A | * | 9/1999 | Schaty ................... 411/433 X |

FOREIGN PATENT DOCUMENTS

| | | |
|---|---|---|
| DE | 196 34 309 | 2/1998 |
| EP | 0 325 069 | 7/1989 |
| EP | 1 083 341 | 3/2001 |
| GB | 2154648 | 9/1985 |

* cited by examiner

Primary Examiner—Neill Wilson
(74) Attorney, Agent, or Firm—Lowe Hauptman Gilman & Berner LLP

(57) ABSTRACT

A plastic fastening element is configured to be fastened on a threaded bolt welded to a support member. The fastening element includes a first hollow element portion made of plastic material and having an axial through hole. The through hole has a polygonal cross section and radially resilient wall portions that will be radially outwardly deformed if the first element portion is pushed onto the threaded bolt. The fastening element also includes a second hollow annular element portion which is connected to one end of the first element portion by a breakable connecting portion. The second element portion has an inner cross section dimensioned such that the second element portion can be pushed over the first element portion under radial deformation of the resilient wall portions, whereby a thread of the threaded bolt is partially formed into the resilient wall portions of the first element portion.

21 Claims, 3 Drawing Sheets

FASTENING HAVING INNER DEFORMABLE HOLLOW ELEMENT AND OUTER SLEEVE

FIELD OF THE INVENTION

The invention relates to a fastening means comprising a threaded bolt and a fastening element adapted to be fastened on the threaded bolt.

BACKGROUND OF THE INVENTION

It is known to use fastening bolts, on which parts can then be mounted, in the automobile car body industry, the shipbuilding industry, and other applications. In the case of automobiles, for example, those parts are cables, lines, and the like. The fastening bolts are mostly welded thereon and will stand out from the carrier. They normally are threaded. However, it is also known to groove them.

Fastening elements of plastic material are known which can be engagingly pushed over the fastening bolts. The fastening elements are mostly sleeve-like and have inner protrusions which are resilient and engagingly cooperate with the thread of the fastening bolts. It is in this way that the fastening element may be mounted on the bolt by simply pushing it over the bolt or delivering a blow onto it. Removal is possible later, but requires the fastening element to be turned off like a nut.

The known fastening means are efficient, but they sometimes have the disadvantage that the fastening element is allowed to rotate on the fastening bolt or rotary forces are not counteracted by a major obstacle.

SUMMARY OF THE INVENTION

Therefore, it is the object of the invention to provide a fastening means or fastening element which can be mounted in a particularly firm fashion on a fastening bolt, but can also be removed again and can be used a plurality of times. The inventive fastening element of plastic material comprises two portions which, however, are formed as a unit, particularly in a plastic injection molding process. The first portion is a hollow part having a throughgoing axial passage the cross-section of which is polygonal. The wall of the passage has resilient portions such that they are radially outwardly deformed if the first portion is pushed onto the threaded bolt under a more or less large axial force. The axial force to be exerted here should not be so large that the second element portion which can be sheared off or broken off is released from the first one. Therefore, the prefabricated fastening element may be pre-assembled by pushing it onto the threaded bolt.

The annular second portion which is formed to one end of the first portion has an inner cross-section which is dimensioned such that it can be pushed over the outer side of the first portion under radial inward deformation of the resilient wall portions in an engagement with the thread. In dependence on the hardness of the material used for the fastening element, the thread tips engage the resilient wall portions more or less deeply so that this manner prevents the fastening element from being stripped off the threaded bolt. It is impossible for the resilient wall portions to slip away sidewards because the second element portion prevents them from doing so. If the fastening element is to be removed from the threaded bolt it requires to be unscrewed from the thread of the fastening bolt.

To facilitate an introduction of the threaded bolt into the first portion, the passage of the first element portion, according to an aspect of the invention, is provided with a conical entrance portion at the end opposite to the second element portion.

The first element portion is preferably shaped like a cage and, for example, has a plurality of circumferentially spaced ribs or webs extending in an axially parallel manner which undergo radial deformation while striking on the thread of the fastening bolt. Therefore, the diameter of the circle which the insides of the ribs or webs describe is somewhat smaller than the tip diameter of the thread of the threaded bolt. To make it easier to radially deform the ribs, webs or other resilient wall portions, one aspect of the invention provides for axially parallel slots to be located between these portions.

The second annular element portion has an inner contour which approximately matches with the outer contour of the first element portion with the contour being preferably non-circular. In this way, a torque which readily is transmitted to the inner element portion can be applied to the outer or second element portion in order to rotate the fastening element. Disassembly is performed by unscrewing it as was mentioned previously. To this effect, the bolt thread cuts its way into the segments or wall portion of the inwardly biased cage. If a cutting element is contemplated at the upper end of the threaded bolt the thread may also be formed in by chip removal. It is possible to screw it on and off for a repeated assembly and disassembly.

According to another aspect of the invention, a provision is made for the first and second element portions to have locking portions which get into engagement with each other when the second element portion is completely pushed over the first element portion. This interlocking may be made largely unreleasable and, according to another aspect of the invention, may be configured in such a way, for example, that the first element portion, at the end opposed to the second element portion, is formed with a flange to which locking portions are formed, in turn, which extend towards the second element portion with a space to the outer side of the first element portion, and cooperate with a locking recess of the second element portion.

BRIEF DESCRIPTION OF THE DRAWINGS

The invention will be explained in greater detail below with reference to embodiments shown in the drawings.

DETAILED DESCRIPTION OF THE INVENTION

Figure 1:
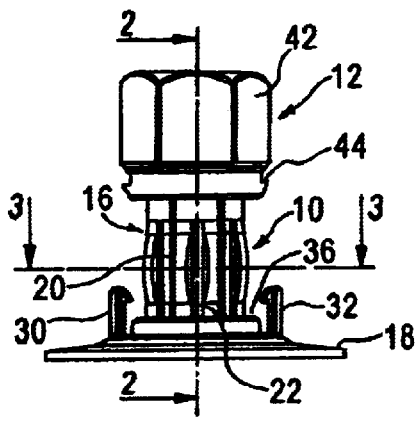
FIG. 1 shows the fastening element according to the invention in a side view.
Figure 2:
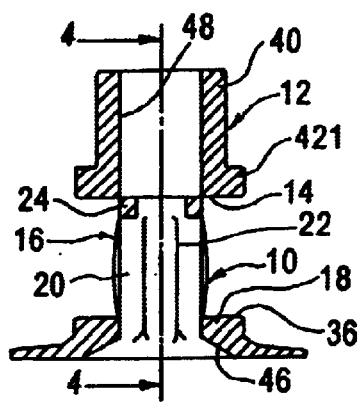
FIG. 2 shows a section through the representation of FIG. 1 along line 2—2.

Referring to FIGS. 1 through 9, it can be seen that the fastening element which is shown comprises two portions, i.e. a first or lower portion 10 and a second or upper portion 12. These portions 10 and 12 are interconnected at 14 at the upper end of portion 10 so that they can be broken off. Thus, the fastening element is integrally manufactured in an injection molding process. The first or lower element portion 10 comprises a shank 16 in the upper region and a flange 18 formed thereto, in the lower one. The shank 16, which is of a cage type, is parallel to a plurality of bar-shaped portions 20 disposed at a circumferential spacing between which a slot 22 is disposed. The portions 20 and slots 22 extend approximately in parallel with the axis of the shank 16. As can be seen from the individual Figures the bar-shaped portions are slightly bulged outwardly, which gives the shank 16 a cask-like outer contour.

The bar-shaped portions 20 are joined to an annular portion 24 at the upper end and to the radial flange 18 at the lower end.

Figure 3:
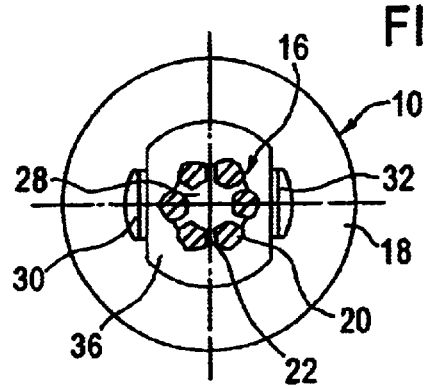
FIG. 3 shows a section through the representation of FIG. 1 along line 3—3.
Figure 4:
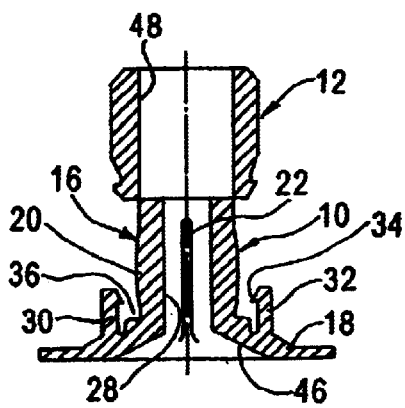
FIG. 4 shows a section through the representation of FIG. 2 along line 4—4.
Figure 5:
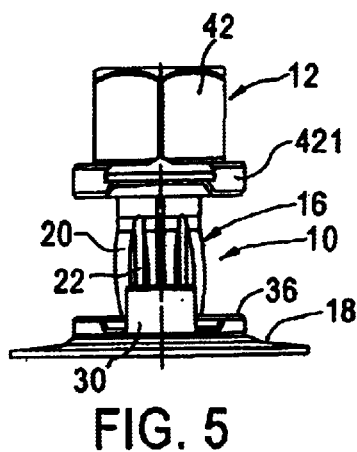
FIG. 5 shows the fastening element of FIG. 1 in a side view rotated through 90°.
Figure 6:
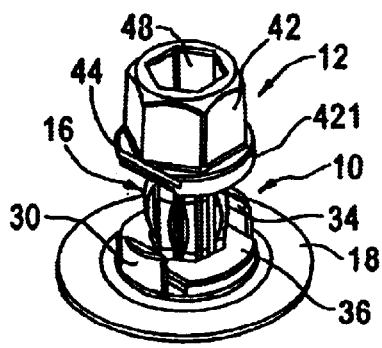
FIG. 6 shows the fastening element of FIG. 1 in a perspective view.
Figure 7:
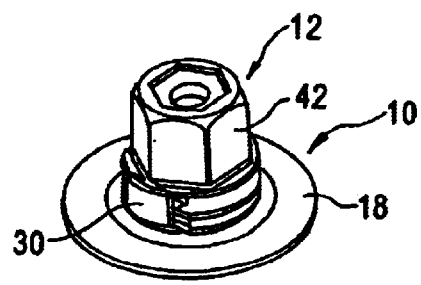
FIG. 7 shows how to push the upper element portion over the lower one.
Figure 8:
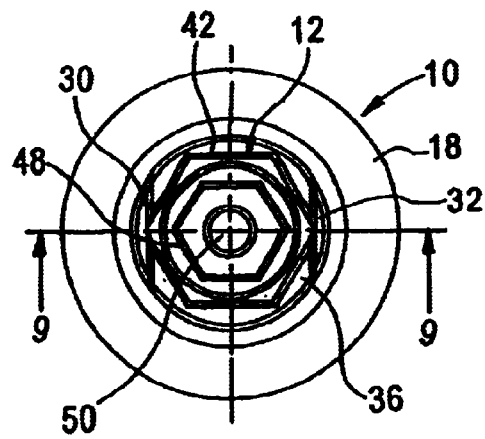
FIG. 8 shows a plan view of the fastening means of FIG. 7.

As can be recognized specifically in FIG. 3 the bar-shaped portions are polygonal in cross-section and define an inner or axial passage or channel 28 of a polygonal cross-section which is hexagonal here.

The flange 18 has formed thereto diametrically opposed interlocking portions 30, 32 which have an interlocking lug 34 at the upper end. Portions 30, 32 extend upwards approximately in parallel with the shank 16 with a space to this one towards the second element portion 12. The lugs face inwards and a shoulder 36 is formed within portions 30, 32 for a purpose which will be described below.

The second element portion 12 is annular or sleeve-like and has an upper portion 40 which possesses an outer hexagon 42 like a hexagon nut for actuation by a screwdriver. Flange portions 421 are formed in the lower region on diametrically opposed sides. Diametrically opposed recesses 44 are formed at an offset of 90° therefrom which extend in parallel and with a space from each other.

The passage 28 has a conically flared feed portion 46 in the area of the flange 18. The ribs, segments or bar-shaped portions 20 define an outer hexagonal contour. This can be seen particularly from FIG. 3. The inner hexagonal contour of the portion is fittingly designed in an appropriate way as is depicted at 48 in FIG. 6.

Figure 9:
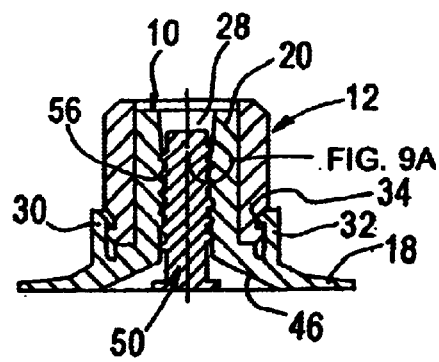
FIGS. 9 and 9A show a section taken along line 9—9 of FIG. 8, and an enlarged view of the section, respectively.
Figure 9A:
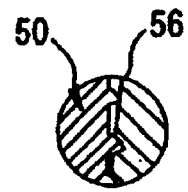

In FIGS. 9 and 9A, a so-called stud bolt 50 is shown which is welded to a carrier which is not shown, e.g. a car body plate or the like, at one end. It has a saw-tooth thread 56. In FIG. 9, the fastening element illustrated in the preceding Figures is mounted on the stud bolt 50. For assembly, the prefabricated assembly of FIGS. 1 through 6 is placed onto the thread 56 of the bolt 50. This does not require any particularly large force. In case of need, assembly can be made with some slight hammer blows until the flange 18 bears against the carrier surface, for example. Subsequently, a more powerful blow onto the upper element portion 12 will separate this one from the lower element portion 10 so that the upper portion 12 is pushed over the shank 16 as can be seen from FIGS. 7 and 9. While the upper portion 12 is pushed over the lower one the segments 20 undergo a slight radial inward deformation, thus getting in engagement with the thread 56 of the bolt 50 at the inside, i.e. the tips of the thread dig their way into the material of the segments 20. The lower front-end face of the upper element portion 40 comes to bear on the shoulder 36 with the lugs 34 of the interlocking portions 32 locking into place in the locking recesses 44. This way interlocks the two portions 10, 12 against each other and can no longer be moved apart. If a disassembly of the fastening element is intended it has to be turned off from the bolt 50. This causes the thread 56 to further cut its way into the segments 20. Subsequently, the fastening element may be screwed onto the bolt again if this is desirable. It is also possible to provide the bolt with a thread-cutting portion at its upper end so that the bolt cuts a thread into the passage 28.

Figure 10:
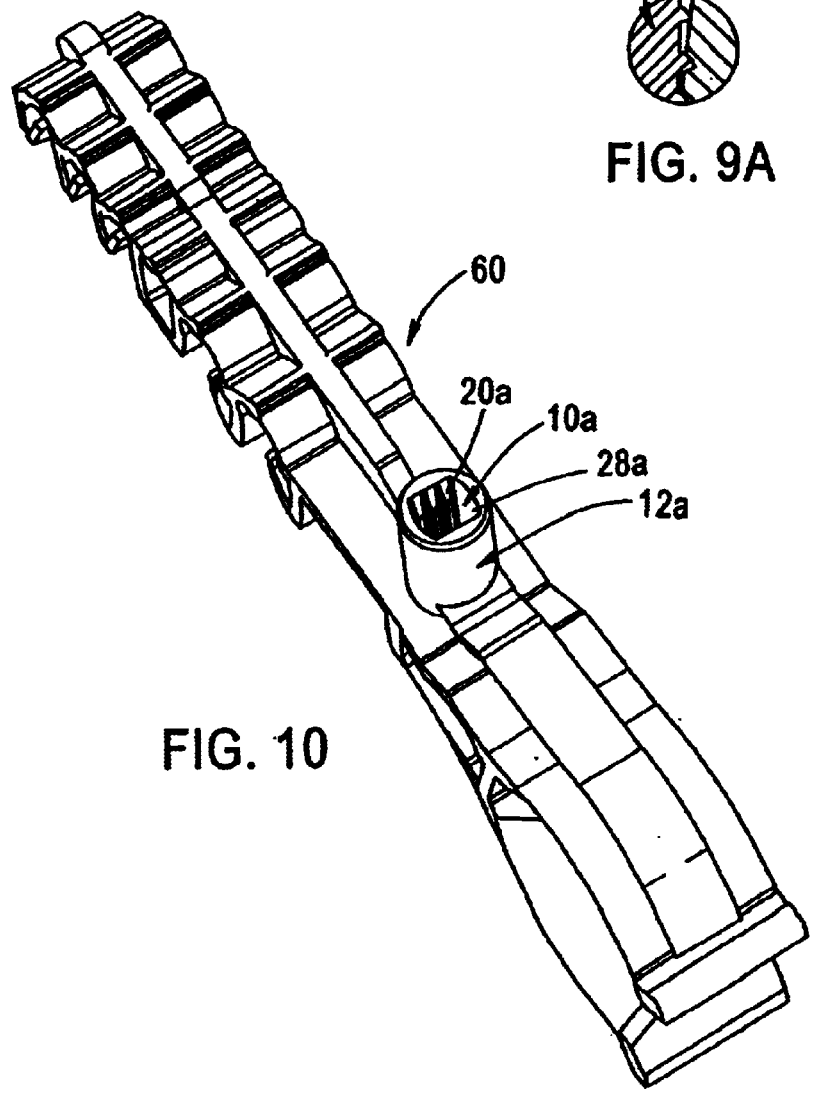
FIG. 10 perspectively shows a first application of the fastening element according to the invention.

An elongate retaining element 60 for a series of lines or cables, the details of which will not be explained here, is shown in FIG. 10. What can be discerned approximately in the centre, however, is that a sleeve-like second element portion 12a surrounds a first element portion 10a which internally is provided with segments 20a comparable to the segments 20 of FIGS. 1 through 9. In the case of FIG. 10, the segments 20a are disposed in a diametrically opposed relationship with two or three segments each being disposed on one side so that they may be brought into engagement with the thread of the fastening bolt which is not shown. The way of action of the fastening element shown in FIG. 10 is the same as the one described above.

Figure 11:
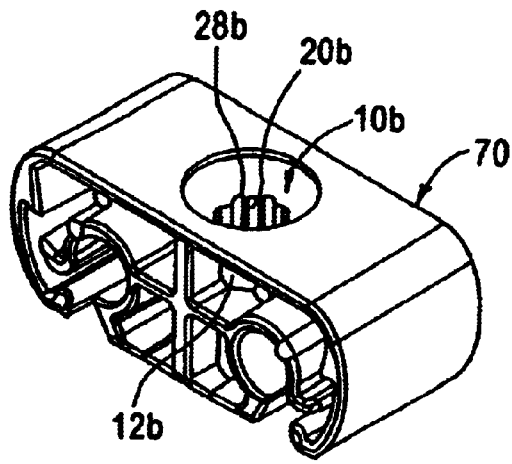
FIG. 11 perspectively shows a second application of the fastening element according to the invention.
Figure 12:
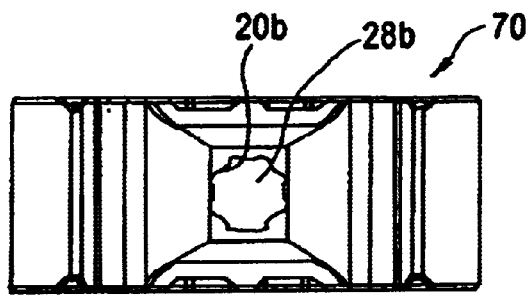
FIG. 12 shows a bottom view from below the fastening element of FIG. 11.
Figure 13:
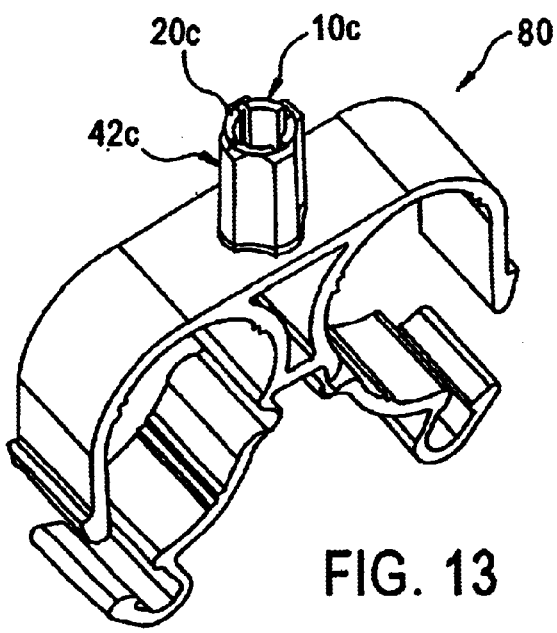
FIG. 13 perspectively shows a third application of the fastening element according to the invention.

Referring to FIGS. 11 and 12, a line holder 70 is illustrated with no detailed reference being made to its structure. It is capable of releasably holding spaced two lines. The upper side of the retaining element 20 has centrally disposed thereon a first fastening portion 10b having a series of axially parallel ribs 20b comparable to the segments 20 and 20a of the previously described Figure. The ribs 20b are radially deformable outwardly and may be brought into engagement with the thread of the threaded bolt, which is not shown, when the holder 70 is pushed onto the bolt. A second portion formed to the portion 10b is only outlined at 12b. It corresponds to the portion 12 of FIGS. 1 through 9, but has no outer hexagon. This coincides with the embodiment of FIG. 10. Nor is an outer hexagon provided there for the second portion 12a. The holder 70 may be turned off from the threaded bolt by gripping the portions thereof. In FIG. 13, a first fastening portion is defined in the form of four segments 20c which are connected to the back of a cable or line holder 80. A second portion 12c is pushed over the first portion 10c and the segments 20c to anchor the fastening element to a threaded bolt. However, this is not shown in FIG. 13. The outer contour of the second element portion 12c is polygonal so as to enable a tool to engage in order to screw the holder 80 off the threaded bolt.

What is claimed is:

1. In combination, a threaded bolt welded to a support member and a fastening element adapted to be fastened on said threaded bolt, said fastening element comprising:
   a first hollow element portion made of plastic material and having an axial through hole, the through hole having a polygonal cross section and radially resilient wall portions that are adapted to be radially outwardly deformed if the first element portion is pushed onto said threaded bolt; and
   a second hollow annular element portion breakably formed to one end of the first element portion, the second element portion having an inner cross section dimensioned such that the second element portion can be pushed over an outer side of the first element portion under radial deformation of the resilient wall portions, whereby a thread of the threaded bolt is partially formed into the resilient wall portions;

wherein the thread of the threaded bolt has a thread cutting portion at a free end thereof.

2. The combination of claim 1, wherein the through hole has a conical entrance portion at the end opposite to the second element portion.

3. The combination of claim 1, wherein an inner side of the first element portion has radially inwardly projecting ribs, webs or segments extending parallel to the axis of the through hole.

4. The combination of claim 3, further comprising slots provided between the ribs, webs or segments extending parallel to the axis.

5. The combination of claim 1, wherein the first element portion, in a region of the resilient wall portions, is slightly outwardly bulged.

6. The combination of claim 1, wherein a cross section of the outer side of the first element portion is also polygonal, the inner cross section of the second element portion corresponding to the cross section of the outer side of the first element portion.

7. The combination of claim 1, further comprising locking elements provided at the first and second element portions the locking elements being adapted to interengage if the second element portion is completely pushed over the first element portion.

8. The combination of claim 7, wherein the first element portion at the end opposite to the second element portion has a flange, the locking elements including locking portions that are formed to the flange and extend towards the second element portion with a space to the outer side of the first element portion, and a locking recess provided on the second element portion.

9. The combination of claim 1, wherein an outer side of the second element portion has wrench surfaces for rotation on the threaded bolt.

10. A fastening element adapted to be fastened onto a threaded bolt, said fastening element comprising:

a first hollow element portion having an axial through hole, the through hole having radially resilient wall portions adapted to be radially outwardly deformed if the first element portion is pushed onto the threaded bolt; and a hollow second element portion breakably formed to one end of the first element portion and having an inner cross section which is dimensioned such that the second element portion can be pushed over the first element portion under radial deformation of the resilient wall portions radially inwardly so that a thread of the threaded bolt can be partially formed into the resilient wall portions;

wherein the first element portion has a configuration of a cage.

11. The fastening element of claim 10, wherein said first element portion includes a plurality of axially extending ribs and slots that are circumferentially arranged in alternating fashion to define said configuration, said ribs defining said radially resilient wall portions, each of said slots extending radially from an outside of said first element portion into said through hole.

12. The fastening element of claim 11, wherein said ribs are connected to each other only at longitudinal ends thereof.

13. The fastening element of claim 11, wherein a middle portion of each of said ribs is outwardly bulged, when the second element portions is not pushed over the first element portion, to define an outer contour of a cask.

14. The fastening element of claim 11, wherein the first element portion has an outer cross section that is polygonal, the inner cross section of the second element portion corresponding to the outer cross section of the first element portion.

15. The fastening element of claim 11, wherein an outer side of the second element portion has wrench surfaces.

16. The fastening element of claim 11, wherein each of said ribs has a hexagonal cross section.

17. The fastening element of claim 11, wherein said first and second element portions are integrally made of plastic.

18. In combination, a threaded bolt welded to a support member and a fastening element adapted to be fastened on said threaded bolt, said fastening element comprising:

a first hollow element portion made of plastic material and having an axial through hole, the through hole having a polygonal cross section and radially resilient wall portions that are adapted to be radially outwardly deformed if the first element portion is pushed onto said threaded bolt; and a second hollow annular element portion breakably formed to one end of the first element portion, the second element portion having an inner cross section dimensioned such that the second element portion can be pushed over an outer side of the first element portion under radial deformation of the resilient wall portions, whereby a thread of the threaded bolt is partially formed into the resilient wall portions;

wherein the threaded bolt has a saw-tooth thread.

19. The combination of claim 18, wherein the first element portion, in a region of the resilient wall portions, is slightly outwardly bulged.

20. The combination of claim 18, wherein a cross section of the outer side of the first element portion is also polygonal, the inner cross section of the second element portion corresponding to the cross section of the outer side of the first element portion.

21. The combination of claim 18, wherein an outer side of the second element portion has wrench surfaces.

* * * * *

UNITED STATES PATENT AND TRADEMARK OFFICE
CERTIFICATE OF CORRECTION

PATENT NO. : 6,729,822 B2
DATED : May 4, 2004
INVENTOR(S) : Sbongk

It is certified that error appears in the above-identified patent and that said Letters Patent is hereby corrected as shown below:

Title page,
Item [30], Foreign Application Priority Data, should read --
Jul. 7, 2001 (DE)   10133063.4 --

Signed and Sealed this

Thirty-first Day of August, 2004

JON W. DUDAS
*Director of the United States Patent and Trademark Office*